United States Patent [19]
Young et al.

[11] Patent Number: 5,921,730
[45] Date of Patent: Jul. 13, 1999

[54] ROTARY POWER TOOL WITH REMOTELY ACTUATED CHUCK

[75] Inventors: Gary Young; Thomas Durham, both of Six Mile, S.C.

[73] Assignee: Power Tool Holders Incorporated, Wilmington, Del.

[21] Appl. No.: 09/067,629

[22] Filed: Apr. 28, 1998

[51] Int. Cl.$^6$ ..................................................... B23C 1/20
[52] U.S. Cl. .......................... 409/182; 279/50; 279/134; 408/240
[58] Field of Search ........................ 144/136.95; 279/50, 279/57, 74, 134, 135, 142; 409/182; 408/239 R, 240

[56] References Cited

U.S. PATENT DOCUMENTS

| | | | |
|---|---|---|---|
| 2,353,966 | 8/1944 | Panza et al. | 279/50 |
| 2,370,729 | 3/1945 | Hoppe | 279/50 |
| 2,466,651 | 4/1949 | Zagar | 279/50 |
| 2,655,826 | 10/1953 | Goldsby | 279/50 |
| 3,095,205 | 6/1963 | Farnsworth | 279/74 |
| 3,811,361 | 5/1974 | Seely et al. | 409/182 |

*Primary Examiner*—Daniel W. Howell
*Attorney, Agent, or Firm*—Dority & Manning

[57] ABSTRACT

A rotary power tool is provided having a remotely actuated chuck device. The chuck is mounted onto the end of a drive spindle that extends from the casing of the power tool. The chuck includes an outer sleeve member that is axially movable relative to the drive spindle between a gripping position and a release position. A sleeve actuating device is provided having a first member engaged with the outer sleeve member and which extends generally radially outward from the drive spindle or chuck. The first member is movable in a direction so as to move the outer sleeve member between the gripping position and the release position. The sleeve actuating device includes an actuator member configured with the first member to move the first member upon an external force being applied thereto. In this manner, an operator can move the chuck device between the gripping and release positions at a location remote from the chuck device and drive spindle.

33 Claims, 5 Drawing Sheets

5,921,730

ROTARY POWER TOOL WITH REMOTELY ACTUATED CHUCK

BACKGROUND OF THE INVENTION

The present invention relates to a rotary power tool having a chuck device for holding a tool bit to a drive spindle wherein the chuck device is remotely actuated.

There are any number of well known types of power tools wherein a chuck is mounted on the end of a rotatable drive spindle for holding a tool bit to the drive spindle. In many applications of these tools, it is necessary to manually manipulate or engage the chuck in order to change out the tool bit. A number of chuck devices utilize an axially movable outer sleeve member to actuate the chuck. For example, many such chuck devices have an axially movable outer sleeve that moves between a gripping position wherein the chuck grips upon a tool shank inserted into the chuck, and a release position wherein the chuck releases the tool shank inserted therein. Such chuck devices are commonly referred to as "quick-change" chucks. For example, one such chuck is illustrated and described in U.S. Pat. No. 2,807,473. Additional examples of similar types of chucks are illustrated in U.S. Pat. Nos. 4,692,073 and 3,521,895. U.S. patent application Ser. Nos. 08/808,890 and 08/740,101 owned by Power Tool Holders Incorporated describe other types of sleeve actuated chucks.

In certain operating environments, however, particularly with high speed routers, there is limited space in the critical area of the chuck device and tool bit to actuate the chuck for removal or insertion of the tool bit. Particularly with routers, the operation of changing out the tool bits can be cumbersome and potentially dangerous, especially where the operator must insert his hands next to the cutting edges of the tool bit. Typically, in order to avoid injury, the operator must move the router guide away from the chuck and tool bit in order to gain access to the chuck.

The present invention provides an apparatus for remotely actuating chuck devices on rotary power tools in a safe and quick manner.

OBJECTS AND SUMMARY OF THE INVENTION

It is therefore a principal object of the present invention to provide a power rotary tool incorporating a mechanism for remotely actuating the chuck device.

An additional object of the present invention is to provide a mechanism for safely changing out tool bits in rotary power tools wherein the operator's hands are totally removed from the cutting area of the tool bits.

Still a further object of the present invention is to provide a mechanism for remotely actuating chucks on rotary power tools so that actuation of the chuck is no longer limited by manual hand strength.

Additional objects and advantages of the invention will be set forth in part in the following description, or may be obvious from the description, or may be learned through practice of the invention.

In accordance with the objects and purposes of the invention, a rotary power tool is provided having a remotely actuated chuck device mounted on the end of a rotatable drive spindle. The power tool includes a casing housing the drive spindle with an end of the spindle extending through the casing and coupled with the chuck device.

The chuck device includes an outer sleeve member that is axially movable relative to the body member of the chuck between a gripping position wherein the chuck device clamps upon a tool bit held within the chuck device, and a release position wherein the chuck device releases the tool bit. The present invention is not limited to any particular type of chuck device and, in this regard, the internal working mechanism of the chuck device is not particularly important to the invention or necessary for an understanding of the invention. It is intended that the present invention be utilized with any manner of chuck device which utilizes an outer sleeve member that is movable between a release position and a gripping position.

The rotary power tool according to the invention also includes a sleeve actuating device having a first member that is engaged with the outer sleeve member of the chuck and which extends generally radially outward from the chuck, preferably beyond the casing of the power tool. The first member is movable or pivotable in a direction so as to move the outer sleeve member of the chuck between the gripping position and the release position. The sleeve actuating device includes an actuator member configured or coupled with the first member to move the first member upon an external force being applied to the actuator member. The external force may be a manual force, pneumatic force, electric force, hydraulic force, etc. In this manner, upon the external force being applied to the actuator member, the first member causes the chuck to move between the gripping and release positions. Thus, the operator can remotely actuate the chuck while being completely removed from the working area of the tool bit held by the chuck.

In a preferred embodiment of the invention, the actuator member includes a lever arm that is connected to the first member and extends generally longitudinally along an outside surface of the tool casing. In one embodiment, the lever arm is generally perpendicular to the first member and is pivotal or movable in the same plane of movement as that of the first member. In this embodiment, the lever arm is pivotal in a radial direction relative to the drive spindle. In other words, the lever arm pivots towards and away from the casing. This pivotal movement of the lever arm also causes the first member to move or pivot away from and towards the chuck sleeve member, particularly if the first member and lever arm share the same pivot point. In other words, the first member moves in a radial arc away from the sleeve member in one direction and towards the sleeve member in the other direction. The first member is physically engaged with the sleeve member and thus imparts an axial movement to the sleeve member as it is caused to move by the lever arm. In this embodiment, it may be preferred that the first member and lever arm are formed as a single integral component.

In an embodiment similar to that just described, the lever arm may actually comprise a radially extending portion of the first member. In other words, the lever arm need not extend at an angle from the first member. In this embodiment, a pivot point is operationally disposed between and shared by the lever arm and the first member wherein pivotal movement of the lever arm in a radial arc relative to the drive spindle causes the first member to move as described above.

In an alternative preferred embodiment of the lever arm configuration, the lever arm extends generally longitudinally along an outside surface of the casing and is operably connected to the first member so as to move in a plane generally perpendicular to a plane of movement of the first member. For example, the lever arm may be pivotally mounted relative to the casing so as to rotate in a plane that is generally parallel to the drive spindle. On the other hand, the first member may be pivotally mounted to the casing so as to pivot in a radial arc towards and away from the drive spindle, as described above. In this embodiment, a joint mechanism is operationally disposed between the lever arm and the first member to convert the rotational movement of the lever arm to the pivotal movement of the first member. In a preferred embodiment, the joint mechanism may comprise a ball joint or universal joint.

The first member that engages the sleeve member can be physically engaged with the sleeve member in any manner or configuration. In a preferred embodiment, the sleeve member incorporates a circumferential groove defined around the outer circumference of the sleeve. The first member includes engaging arms that extend into the circumferential groove. In the gripping position of the sleeve member, which is the position assumed by the chuck device in the running operational mode of the power tool, the engaging arms do not contact any member of the sleeve or circumferential groove so as not to interfere with operational rotation of the drive spindle and chuck. When the first member is moved, the engaging arms contact the sleeve member and move the sleeve member between the gripping and release positions.

It should be appreciated that the rotary power tool according to the invention can comprise any make or configuration of power tool, for example, drills, lathes, tapping mechanisms, etc. In a preferred and particularly useful embodiment of the invention, the power rotary tool comprises a router and the chuck device is specifically configured to hold a routing bit to the drive spindle of the router.

The remote actuating mechanism according to the invention may be incorporated as a component of the power tool casing, or may be an after-market retrofit item that can be easily installed on existing rotary power tools. In this embodiment, the mechanism may include a base member that is easily attachable to any manner of conventional rotary power tool. Accordingly, the present invention includes the remote actuating mechanism separate from the rotary power tool or chuck device.

Preferred embodiments of the present invention will now be discussed in detail with reference to the following figures.

DETAILED DESCRIPTION OF THE PREFERRED EMBODIMENTS

Figure 1:
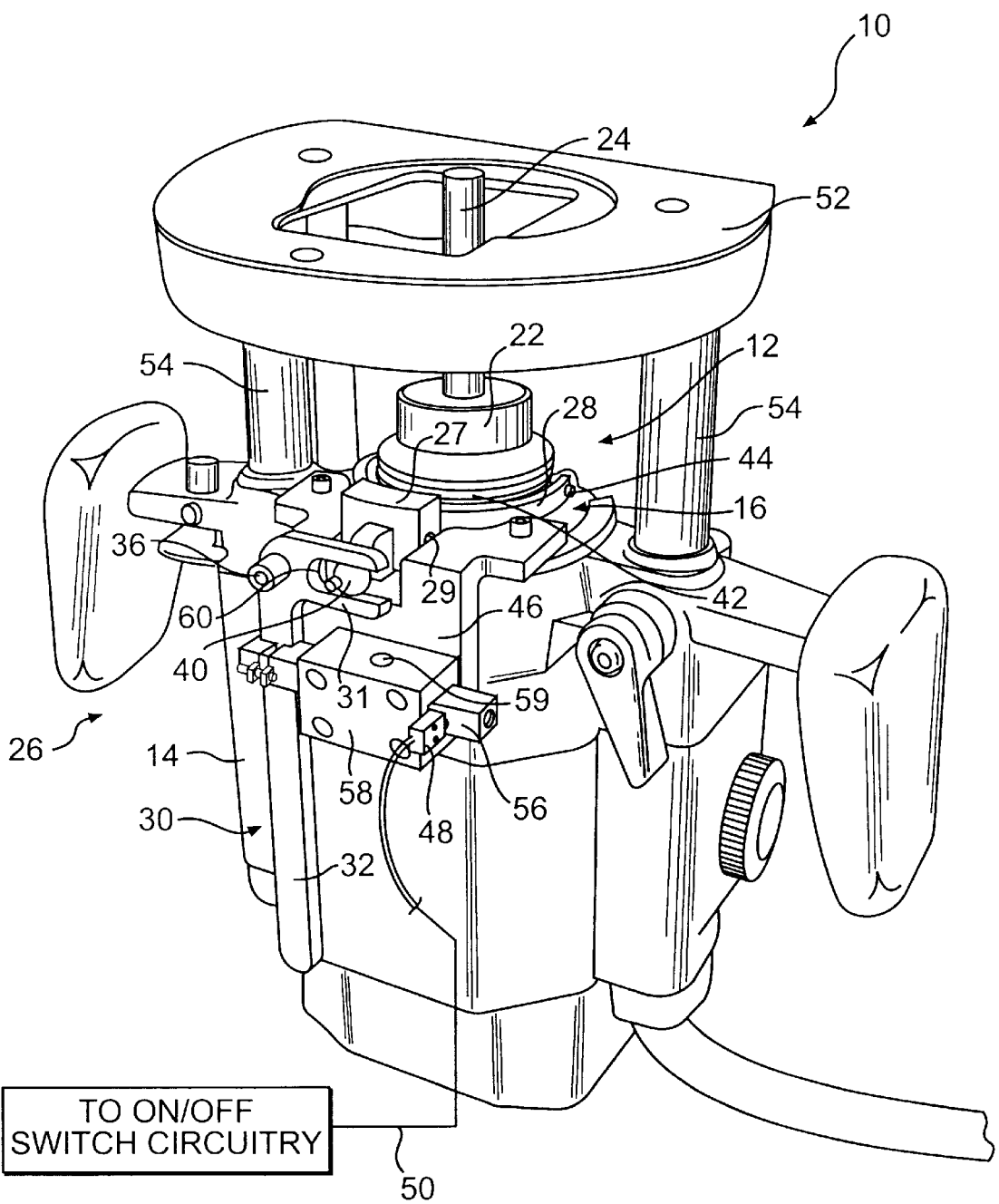
FIG. 1 is a perspective view of a power tool, particularly a router, according to the present invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield still a third embodiment. It is intended that the present invention include such modifications and variations as come within the scope and spirit of the invention.

The present invention relates to power tools in general. For example, referring to FIG. 1, a conventional router 10 is illustrated. It should be appreciated, however, that the present invention is not limited to any particular type of power tool. Router 10 is illustrated as an example and for ease of explanation of the invention. The present invention relates to any manner of power tool incorporating a chuck device 12 that is actuated by axial movement of outer sleeve member 22.

It should also be appreciated that the type of chuck 12 is not particularly important to the invention. The invention applies to any manner of chuck, for example, the chucks described and illustrated in the patents and applications discussed above, wherein the chuck 12 is actuated by moving a sleeve member 22 relative to a body member (not labeled) or drive spindle of the power tool. In this regard, the chuck 12 will not be described in detail herein as it is not necessary for an understanding of the invention. One particular type of chuck for which the present invention is particularly applicable is illustrated and described in co-pending U.S. patent application Ser. No. 08/922,411 and U.S. patent application Ser. No. 08/909,343 commonly owned by assignee Power Tool Holders Incorporated, the entire disclosures of which are incorporated herein by reference in their entirety for all purposes.

Figure 6:
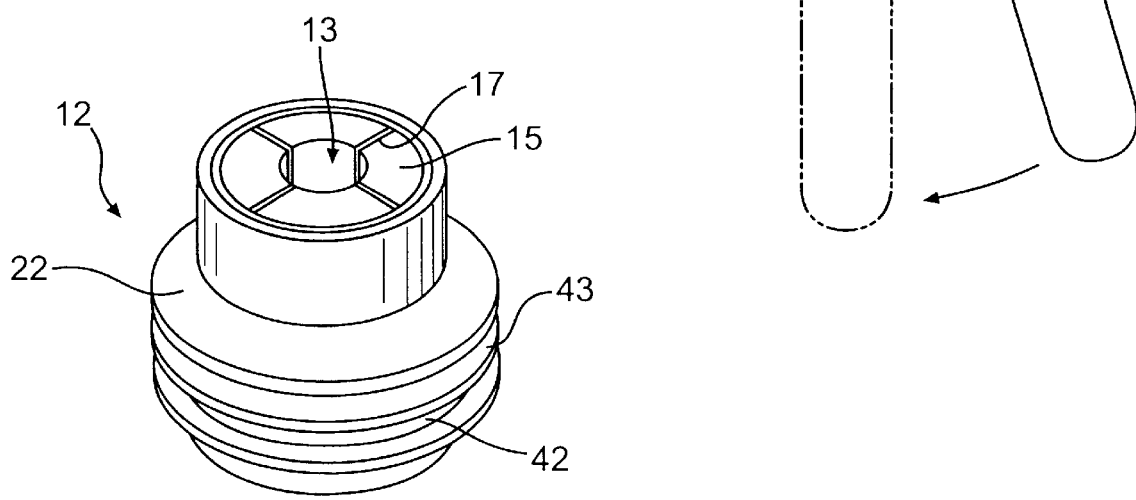
FIG. 6 is a perspective view of one type of chuck for which the remote actuating device is applicable.

A chuck similar to the pending U.S. application Ser. No. 08/922,411 is illustrated generally in FIG. 6. With this particular type of chuck 12, an axial bore 13 is defined by a plurality of longitudinally extending gripping segments 15 separated by axially extending slits 17. An axially movable sleeve member 22 surrounds the gripping segments 15. An operating mechanism (not shown) is disposed between sleeve member 22 and gripping segments 15 to compress the segments radially inward upon the operating sleeve being moved to a gripping position to grip upon a tool shank inserted into bore 13, and to release the tool shank from gripping segments 15 once sleeve 22 is moved to a release position. Chuck 12 according to the invention may comprise any conventional structure or mechanism, such as a sleeve 43 defining a circumferential groove 42, for engaging with the sleeve actuating device 26, as described in greater detail below. Circumferential groove 42 may be formed as an integral component of sleeve 22 or, in an alternative embodiment, additional sleeve 43 can be removably placed on sleeve member 22. This embodiment may be particularly useful in retrofitting the present inventive device to existing rotary power tools and chuck devices.

Referring to the figures in general, rotary power tool 10 according to the invention includes a body or casing, generally 14. Casing 14 generally surrounds the drive spindle and incorporates the motor device for rotationally driving the spindle. The casing has a forward or front end, generally 16, from which the drive spindle extends. Chuck device 12 is mounted onto the end of the drive spindle extending from the forward end 16 of casing 14.

In many applications of rotary power tools, the space around the chuck 12 and the work surface is extremely limited. This is particularly true with routers, such as illustrated in FIG. 1, wherein a router guide 52 and plungers 54 are also disposed in the same critical working space. With these types of devices, it is difficult for an operator to manually grasp and actuate chuck 12 in order to change out or adjust tool 24 held by chuck 12. In this regard, the present invention provides a system for remotely actuating chuck device 12.

The sleeve actuating device, generally 30, according to the invention includes a first member, generally 28, extending radially outward from the drive spindle or chuck 12 preferably beyond casing 14, as particularly illustrated in FIG. 1. In a preferred embodiment illustrated in the figures, first member 28 is defined by a semi-circular member 21 attached to a straight arm member 23. Engaging arms or members 44 extend radially inward from semi-circular member 21 into groove 42 defined in sleeve member 22. First member 28 is pivotally mounted in housing 27 by way of a pivot pin 29 extending through hole 29a in arm member 23. It should be appreciated that first member 28 can take on any conventional shape or configuration and that the embodiment illustrated in the figures is but one example of a countless number of configurations.

First member 28 is movable in a direction so that it imparts axial movement to sleeve member 22 to move the sleeve member between the gripping and release positions. In the illustrated embodiment, first member 28 pivots about pin 29 so that the ends of semi-circular member 21 move in an arc that approaches sleeve member 22 in one direction and moves away from sleeve member 22 in the other direction. When first member 28 is pivoted, engaging arms 44 disposed within groove 42 engage either side of sleeve member 43 defining groove 42 and impart axial movement to sleeve member 22 depending on the pivoting motion of arm member 28.

It should be appreciated by those skilled in the art that arm member 28 is not limited to a pivoting motion, but could also impart axial movement to sleeve 22 with direct axial movement of member 28.

Sleeve actuating device 26 also includes an actuating member, generally 30, configured with first member 28 to move the first member upon an external force being applied to actuating member 30. In this manner, an operator can apply an external force to actuating member 30 causing first member 28 to move sleeve 22 of chuck device 12 between the gripping and release positions. The actuating force may be applied manually by hand, or by an electric, hydraulic or pneumatic device.

In a preferred embodiment of the invention illustrated in the figures, actuating member 30 comprises a lever 32 that is connected to first member 28 and which extends generally longitudinally along an outside surface of casing 14. Lever 32 is pivotally mounted with a pivot pin 36 extending through a hole 36a in lever 32 and into a hole 36b. Lever arm 32 is connected or configured with first member 28 by way of a universal joint, such as ball joint 40 residing in groove 60 defined in a perpendicular extension 31 of lever arm 32. In this embodiment, lever arm 32 rotates about pivot pin 36 so as to move in a plane substantially parallel to the axis of the drive spindle of the power tool 10. The drive spindle cannot be seen in the figures but has the same longitudinal axis as chuck 12 and tool 24 held thereby. In other words, in the embodiment illustrated in FIGS. 1 through 4, lever arm 32 rotates alongside of casing 14.

Figure 3:
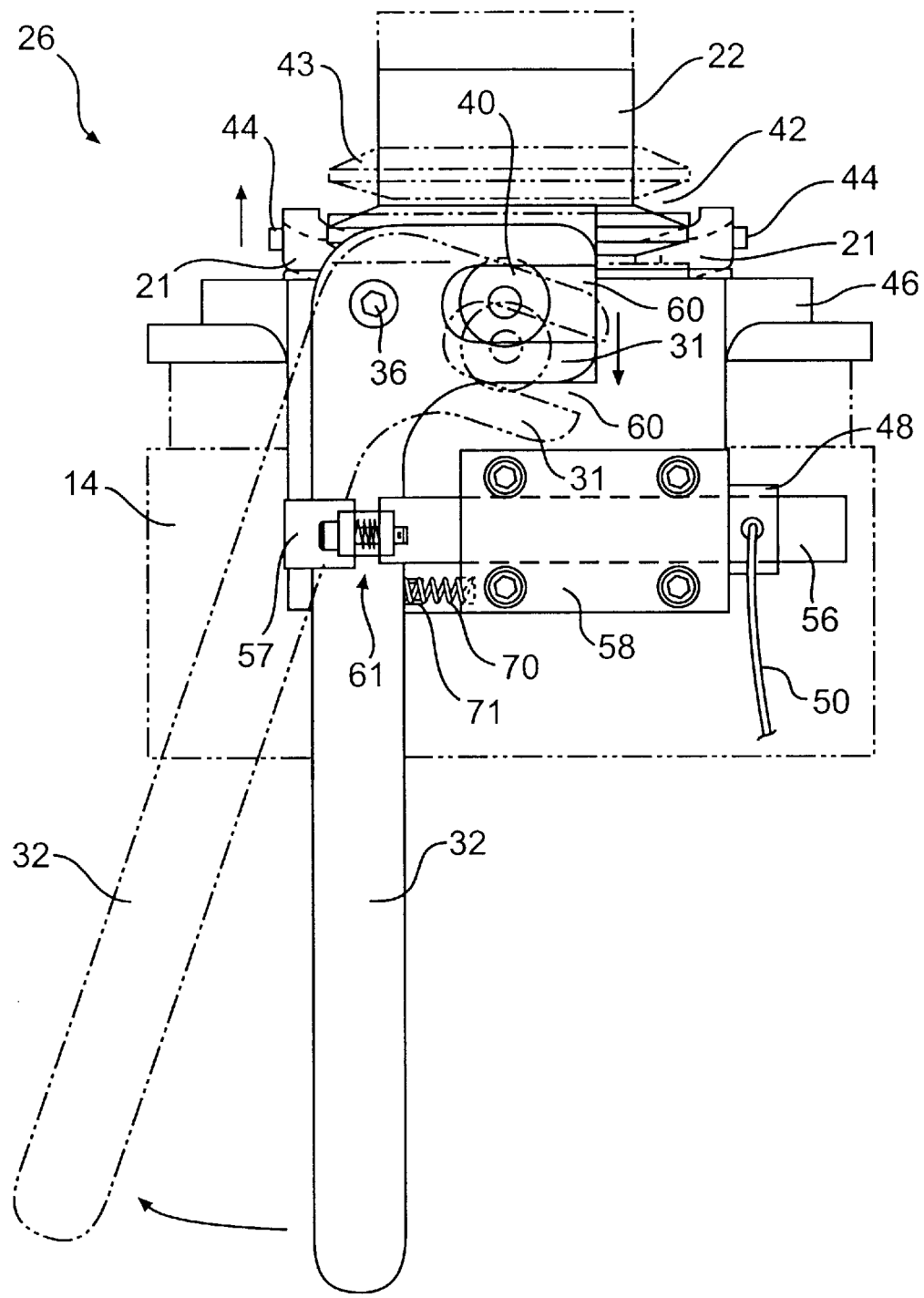
FIG. 3 is a side operational view of the remote chuck actuating device illustrated in FIGS. 1 and 2.
Figure 4:
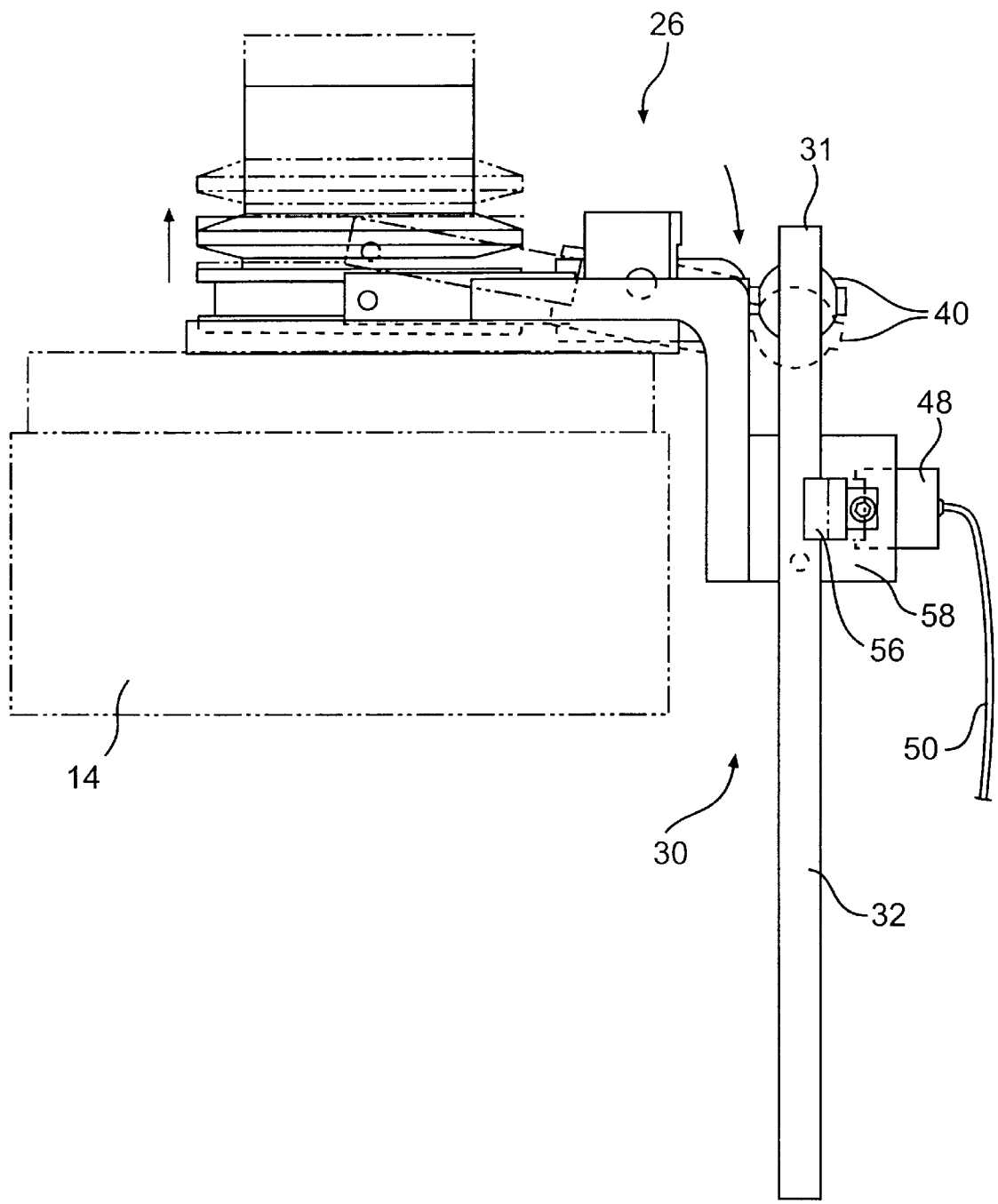
FIG. 4 is a side operational view of the device illustrated in FIG. 3.

Referring particularly to FIGS. 3 and 4, as lever arm 32 is moved from the solid line position shown in FIG. 3 to the dashed line position, it rotates or pivots about pin 36. Ball joint 40 engages in groove 60 and is forced downward as shown in dashed lines in FIG. 3. This downward movement of ball joint 40 causes first member 28 to pivot about pin 29, thus causing engaging arms 44 to move up and away from sleeve member 22. The upward movement of engaging arms 44 imparts an axially upward force to sleeve 22 and moves sleeve 22 into its release position. Movement of lever arm 32 back to the solid line position shown in FIG. 3 causes the reverse movement and sleeve 22 moves back to its gripping position.

Figure 5:
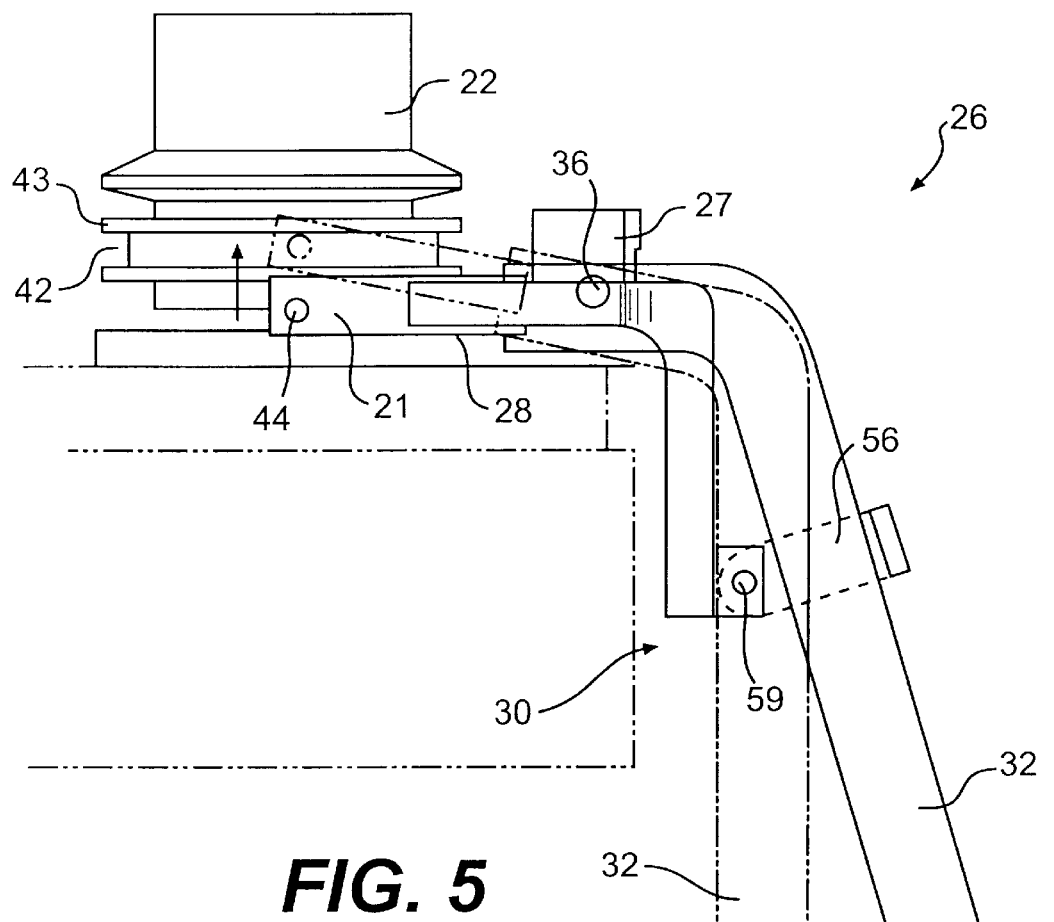
FIG. 5 is a side operational view of an alternative embodiment of the remote actuating device according to the invention.

In the embodiment illustrated in FIGS. 1 through 4, it should be appreciated that lever arm 32 moves in a plane of movement that is essentially perpendicular to the plane of movement of first member 28. It should be appreciated, however, that any number of mechanical links or configurations can be utilized to impart the necessary movement to first member 28 to cause the sleeve member 22 to move axially. For example, an alternative configuration is illustrated in FIG. 5. In this embodiment, lever arm 32 is pivoted about pin 36 in housing 27 and first member 28 is essentially an extension of lever arm 32. Accordingly, lever arm 32 and first member 28 move in the same plane of movement. Referring to FIG. 5, lever 32 is shown in its at-rest position in solid lines wherein sleeve member 22 is in the gripping position. To move sleeve member 22 axially forward or upwards, lever arm 32 is depressed or pushed towards casing 14 causing the arm 21 of the first member to pivot about pin 36 and thus force sleeve member 22 upwards. In this embodiment, first member 28 and lever arm 32 may thus be formed as a single integral component.

In an alternative embodiment not particularly illustrated in the figures, lever arm 32 may actually comprise a straight extension of the first member that extends generally radially outward from casing 14. This embodiment would operate essentially the same as that illustrated in FIG. 5 with the exception that lever arm 32 is not bent at a 90 degree angle with respect to first member 28, but extends essentially straight and radially outward therefrom.

Figure 2:
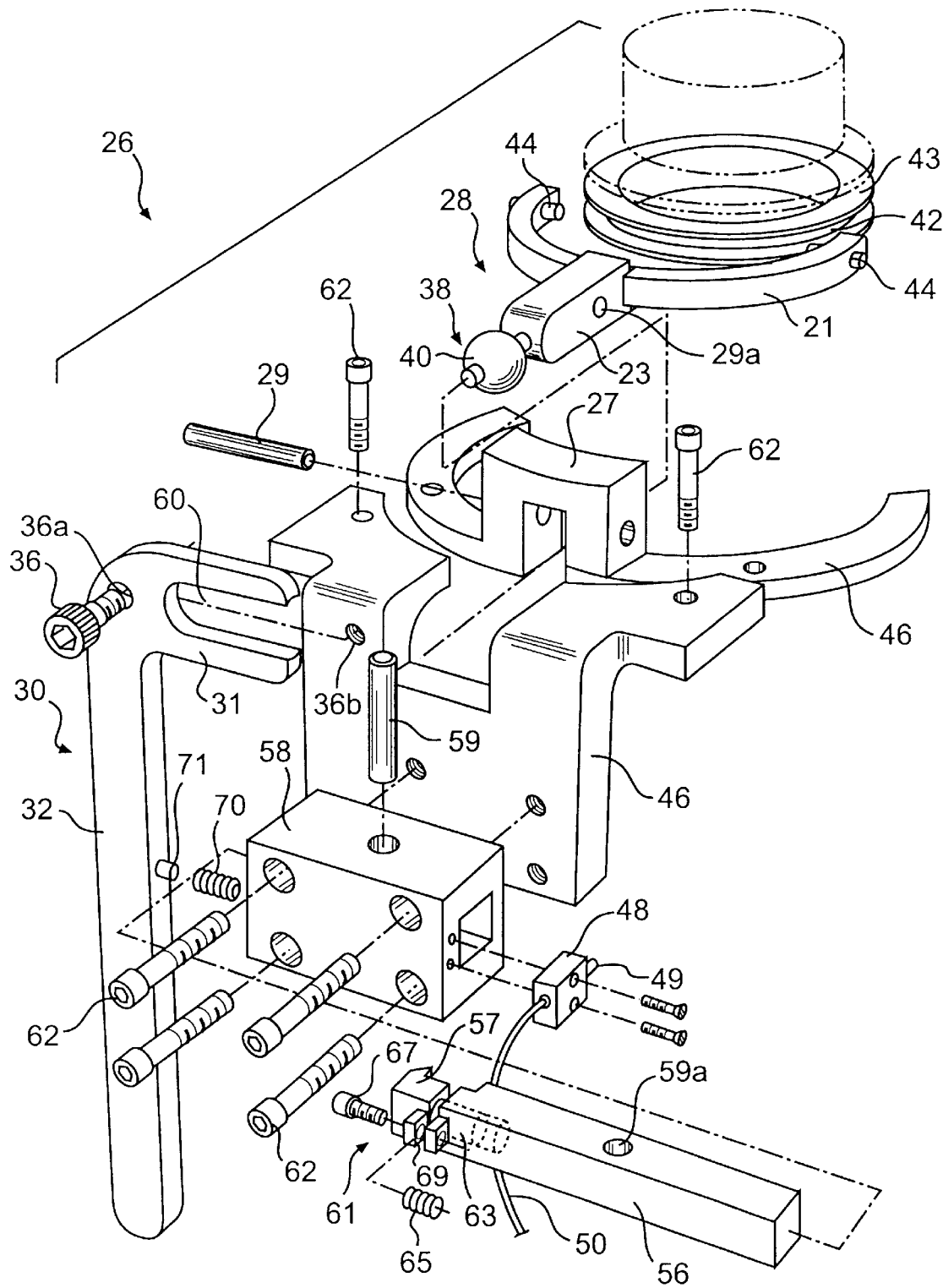
FIG. 2 is an in-line component view of the remote chuck actuating device according to the invention as utilized in the embodiment of FIG. 1.

FIGS. 1 and 2 illustrate an embodiment of the invention wherein the sleeve actuating device 26 has been fitted onto a conventional power tool, such as router 10. In this regard, any manner or configuration of base members 46 may be attached to casing 14 by way of, for example, bolts 62. The configuration of base members 46 can be wide and varied within the scope and spirit of the invention so long as the sleeve actuating device 26 is securely mounted to casing 14 and is capable of performing its desired operation. In this regard, the present invention includes sleeve actuating devices that can be retrofitted to existing power tools.

In an alternative embodiment not particularly illustrated in the figures, sleeve actuating device 26 can be incorporated directly with the power tool casing or housing. In other words, members 28 and 32 could be pivotally mounted directly to housing or casing 14. Again, a wide variety of configurations is within the scope and spirit of the invention in this regard.

The present invention also preferably includes a locking device for ensuring that the actuating member, such as lever arm 32, remains locked in an at-rest position corresponding to the gripping position of sleeve 22. Thus, actuating member 30 cannot be inadvertently moved or engaged to cause sleeve member 22 to move to a gripping position during running operation of the power tool. Referring to FIGS. 1 through 4 in particular, the locking mechanism includes a locking arm 56 pivotally mounted in a housing 58 by way of a pivot pin 59 extending through a hole 59a in locking arm 56. A hook or latch member 57 is configured at one end of arm 56 and latches around lever 32, as particularly illustrated in FIG. 1. In order to release the locking mechanism, the operator would push on the opposite end of arm 56 causing arm 56 to pivot about point 59 to move latching member 57 away from lever arm 32. It should be appreciated by those skilled in the art that any manner of conventional mechanical locking mechanism can be utilized in this regard and that the embodiment illustrated in the figures is but an example of one preferred locking mechanism.

It may also be preferred to incorporate a position indicating device, such as the electronic switch 48 with plunger 49 illustrated in the figures, in order to remotely indicate the locked position of lever arm 32. Position indicating device 48 may be particularly useful if connected via circuitry 50 to the control circuitry of the power tool so that the power tool cannot be operated unless lever arm 32 is in its locked position. It is well within the skill level of those in the art to configure any manner of electronic switch in this regard.

In the embodiment illustrated in FIG. 5 wherein lever arm 32 pivots towards and away from casing 14, the locking device must be suitably arranged to allow movement of lever arm 32. Thus, in this embodiment, locking arm 56 is pivotally mounted via arm 59 to allow lever arm 32 to be moved towards and away from casing 14. Again, any manner of conventional locking device may be utilized in this regard.

It is an important consideration that engagement between first member 28 and sleeve 22 only occurs during axial positioning of sleeve member 22. There should be no engagement between first member 28 and sleeve 22 in the normal operating mode of the power tool so that first member 28 does not impede or hinder rotation of the drive spindle. In this regard, engaging arms 44 should be disposed within groove 42 so as not to contact any portion of the structure defining groove 42 in the normal running mode of the power tool. Likewise, with whatever type of structure is used to engage first member 28 with sleeve 22, it should be ensured that first member 28 is in a non-interfering engagement with the sleeve in the normal operating mode of the power tool.

In this regard, it may be desired to incorporate an adjusting feature with the sleeve actuating device 26 so that the position of first member 28 can be adjusted relative to sleeve 22. One suitable type of adjusting mechanism is illustrated particularly in FIG. 2 and includes a threaded bolt 67 engaged in nuts 69. A spring 65 is provided between nuts 69 to tension the bolt 67. Latching member 57 is axially movable relative to arm 56 by way of an axial extension 63 residing in a bore defined in arm 56. The position of engaging arms 44 within groove 42 can be adjusted simply by adjusting bolt 67 which causes lever arm 32 to pivot about pivot pin 36 in the at-rest position of the device. Thus, the position of arms 44 in the normal operating mode of power tool 10 can be easily adjusted. This feature may be particularly desired wherein the sleeve actuating device is retrofitted to existing power tools, or where different types of chuck devices are interchanged on the power tool.

It should be appreciated by those skilled in the art that various modifications and variations can be made in the present invention without departing from the scope or spirit of the invention. For example, any manner of mechanical links, arms, levers, etc., may be utilized to impart axial movement to the chuck sleeve member from a location remote from the working area of the chuck and tool bit. It is intended that the present invention cover such modifications and variations as come within the scope of the appended claims and their equivalents.

What is claimed is:

1. A rotary power tool having a remotely actuated chuck device, said power tool comprising:
    a casing housing a rotationally driven drive spindle;
    a chuck device attached to an end of said drive spindle, said chuck device comprising an outer sleeve member that is axially movable between a gripping position wherein said chuck device clamps upon a tool held within said chuck device, and a release position wherein said chuck device releases a tool held within said chuck device;
    a sleeve actuating device having a first member engaged with said outer sleeve member and extending generally radially outward from said chuck device, said first member movable in a direction so as to move said outer sleeve member between said gripping position and said release position, said sleeve actuating device further comprising an actuator member configured with said first member to move said first member upon an external force being applied thereto so that an operator can move said chuck device between said gripping and release positions at a location remote from said chuck device and drive spindle.

2. The rotary power tool as in claim 1, wherein said actuator member comprises a lever arm connected to said first member and pivotally mounted relative to said casing.

3. The rotary power tool as in claim 2, wherein said lever arm extends generally perpendicular from said first member and is movable in a plane of movement the same as that of said first member.

4. The rotary power tool as in claim 3, wherein said lever arm is pivotally mounted relative to said casing and movable radially towards and away from said casing causing said first member to pivot towards and away from said sleeve member, said first member thus imparting axial movement to said sleeve member as said first member pivots towards and away from said drive spindle.

5. The rotary power tool as in claim 4, wherein said first member and said lever arm are formed as an integral component.

6. The rotary power tool as in claim 1, wherein said lever arm comprises a radially extending portion of said first member, and further comprising a pivot point shared by said lever arm and said first member wherein pivotal movement of said lever arm towards and away said drive spindle causes said first member to move pivotally away relative to said drive spindle and thus impart an axial movement to said sleeve member.

7. The rotary power tool as in claim 1, wherein said actuator member comprises a lever arm connected to said first member and extending generally longitudinally along an outside surface of said casing, said lever arm operably connected to said first member so as to move in a plane generally perpendicular to a plane of movement of said first member.

8. The rotary power tool as in claim 7, wherein said lever arm extends longitudinally along said casing and is pivotally mounted to said casing so as to rotate in a plane generally parallel to said drive spindle, said first member pivotally mounted to said casing so as to pivot towards and away from said drive spindle thus imparting axial movement to said sleeve member, and further comprising a joint mechanism operationally disposed between said lever arm and said first member to convert rotational movement of said lever arm to pivotal movement of said first member.

9. The rotary power tool as in claim 8, wherein said joint mechanism comprises a ball joint.

10. The rotary power tool as in claim 1, wherein said sleeve member comprises a circumferential groove defined thereon and said first member comprises opposite engaging arms disposed within said circumferential groove.

11. The rotary power tool as in claim 10, wherein in said gripping position of said chuck device said engaging arms are in a non-contacting relationship with said sleeve member within said circumferential groove.

12. The rotary power tool as in claim 1, further comprising a base member attachable to said operational end of said casing, said sleeve actuating device mounted to said base member.

13. The rotary power tool as in claim 1, wherein said power tool is a router and said chuck device is chuck configured to hold a routing bit.

14. The rotary power tool as in claim 1, further comprising a position indicating device configured with said sleeve actuating device to detect when said chuck device is in said release position.

15. The rotary power tool as in claim 14, wherein said position indicating device is interfaced with controls of said power tool and prevents operation of said power tool when said chuck device is in said release position.

16. The rotary power tool as in claim 1, further comprising a locking mechanism for maintaining said sleeve actuating device in a position to keep said chuck device in said gripping position.

17. The rotary power tool as in claim 16, further comprising an adjusting device configured with said locking mechanism, said adjusting device movable to maintain said first member in a non-contacting relationship with said sleeve member in said gripping position of said chuck device.

18. The rotary power tool as in claim 1, further comprising an adjusting device configured with said sleeve actuating device, said adjusting device movable to maintain said first member in a non-contacting relationship with said sleeve member in said gripping position of said chuck device.

19. A mechanism for remotely actuating a chuck device of a rotary power tool wherein the power tool has a rotationally driven spindle with a chuck device mounted on an end thereon, the chuck device having an outer sleeve member that is axially movable relative to the spindle between a gripping position wherein the chuck clamps upon a tool held within the chuck device, and a release position wherein the chuck releases a tool held within the chuck, said mechanism comprising:

a base member with means for mounting on a casing of a power tool;

a sleeve actuating device operationally mounted on said base member, said sleeve actuating device having a first member with an end configured for engagement with the outer sleeve member of the chuck, said first member disposed on said base member so as to extend generally radially outward from the drive spindle when said base member is mounted on the power tool casing, said first member movable relative to said base member in a direction so as to impart linear motion to the outer sleeve member to move the outer sleeve member between the gripping and release positions; and said sleeve actuating device further comprising an actuator member configured with said first member to move said first member upon an external force being applied thereto so that an operator can move the chuck device between the gripping and release positions at a location remote from the chuck device and drive spindle.

20. The mechanism as in claim 19, wherein said actuator member comprises a lever arm connected to said first member and extending generally perpendicular therefrom so as to extend longitudinally along an outside surface of the power tool casing.

21. The mechanism as in claim 20, wherein said lever arm is movable relative to said base member in a plane of movement the same as that of said first member.

22. The mechanism as in claim 21, wherein said lever arm is pivotally mounted relative to base member so as to move radially towards and away from the power tool casing with respect to the drive spindle, said first member pivotally mounted on said base member so that said end thereof configured for engagement with the chuck outer sleeve member pivots towards and away from the drive spindle to impart axial movement to the sleeve member when engaged therewith.

23. The mechanism as in claim 22, wherein said first member and said lever arm are formed as an integral component.

24. The mechanism as in claim 20, wherein said lever arm extends radially from said first member, and further comprising a pivot point operationally disposed between said lever arm and said first member on said base member wherein pivotal movement of said lever arm relative to the drive spindle causes said first member to move pivotally relative to the drive spindle and thus impart an axial movement to the chuck sleeve member.

25. The mechanism as in claim 19, wherein said actuator member comprises a lever arm connected to said first member and pivotally mounted on said base member so as to extend generally longitudinally along an outside surface of the power tool casing, said lever arm movable in a plane generally perpendicular to a plane of movement of said first member.

26. The mechanism as in claim 25, wherein said lever arm rotates in a plane generally parallel to said drive spindle, said first member pivotally mounted on said base member so that said end thereof configured for engagement with the chuck outer sleeve member pivot towards and away from the drive spindle to impart axial movement to the sleeve member when engaged therewith, and further comprising a joint mechanism operationally disposed between said lever arm and said first member to convert rotational movement of said lever arm to pivotal movement of said first member.

27. The mechanism as in claim 26, wherein said joint mechanism comprises a ball joint.

28. The mechanism as in claim 19, wherein said first member comprises spaced apart engaging arms configured to extend into a circumferential groove in the chuck outer sleeve member.

29. The mechanism as in claim 19, further comprising a position indicating device configured with said sleeve actuating device to detect when the chuck is in the release position by detecting the position of one of said first member and said actuating member.

30. The mechanism as in claim 29, wherein said position indicating device is interfaceable with control circuitry of the power tool and prevents operation of the power tool when the chuck is in the release position.

31. The mechanism as in claim 19, further comprising a locking mechanism for maintaining said sleeve actuating device in a position to keep said chuck device in said gripping position.

32. The rotary power tool as in claim 31, further comprising an adjusting device configured with said locking mechanism, said adjusting device movable to maintain said first member in a non-contacting relationship with said sleeve member in said gripping position of said chuck device.

33. The rotary power tool as in claim 19, further comprising an adjusting device configured with said sleeve actuating device, said adjusting device movable to maintain said first member in a non-contacting relationship with said sleeve member in said gripping position of said chuck device.

\* \* \* \* \*